May 22, 1951  H. JOHNSTON, JR., ET AL  2,554,365

VEHICLE DOLLY

Filed Jan. 5, 1946

Patented May 22, 1951

2,554,365

UNITED STATES PATENT OFFICE 2,554,365

VEHICLE DOLLY

Hardee Johnston, Jr., and Alexander Smith, Sanford, Fla.

Application January 5, 1946, Serial No. 639,269

6 Claims. (Cl. 254—8)

This invention relates to mechanism for supporting heavy objects and more particularly the heavy parts of the vehicles, as for example, the transmission and differential housings thereof, whereby their installation and removal is facilitated.

Specifically the invention relates to a dolly designed particularly for use in the removal of the transmission and differentials as well as other heavy vehicle parts and for supporting such parts while any necessary work is done.

Heretofore ordinary vehicle jacks have been unsatisfactory for one reason or another, among which are that they have lacked certain things including satisfactory engaging means thus endangering life and limb and rendering the handling of equipment with facility extremely difficult.

It is an object of the invention to provide a dolly which is relatively simple and inexpensive in construction, durable, satisfactory and efficient in operation.

A further object of the invention is to provide a stand or work holder for the removed parts to hold them in the proper position for easy access.

Figure 1:
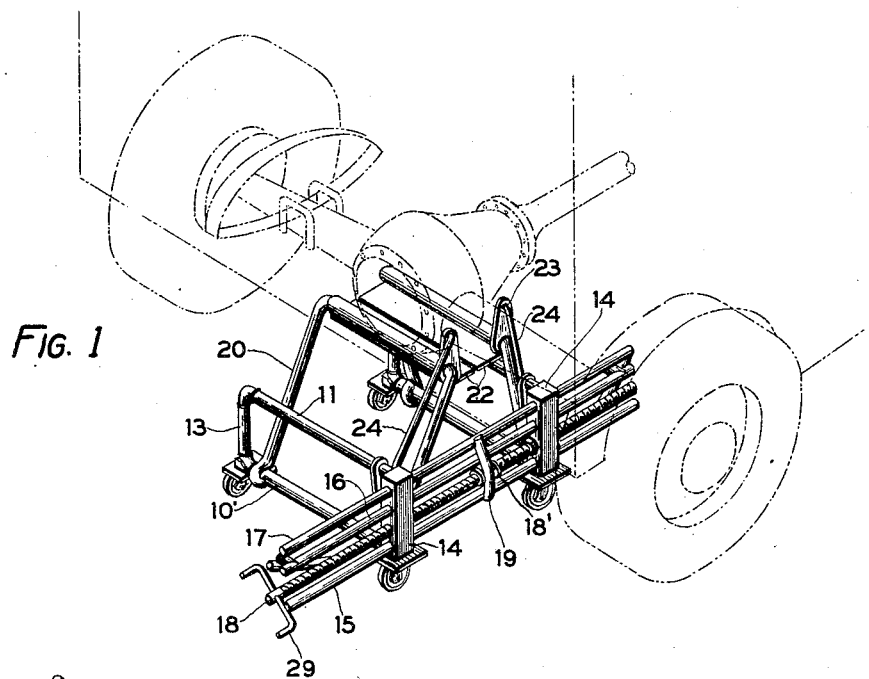
Figure 2:
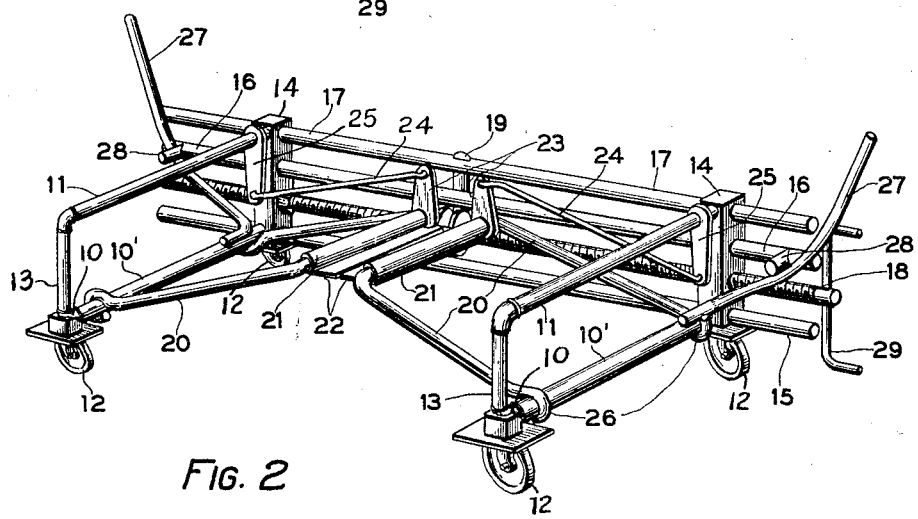

Further objects and advantages of the invention will be apparent from the following description taken in conjunction with the drawings, wherein:

Fig. 1 is a perspective illustrating application of the invention to the differential of a motor vehicle, the differential and associated parts being shown in broken lines, and Fig. 2, an enlarged perspective taken from an angle at 180° to that of Fig. 1.

Referring to the drawings, the invention comprises a pair of rectangular frames of lower and upper horizontal frame members 10 and 11 mounted on supporting casters 12 freely rotatable to permit movement in any direction. Each rectangular frame consists of end posts 13 and 14 which connect the lower and upper horizontal members 10 and 11.

The pair of spaced posts 14 slidably support parallel rods 15, 16, and 17 and means, in the form of a screw 18, is provided for producing movement between the posts and the rods. A screw 18 has right and left hand threads engaged by corresponding threads on the posts so that by rotation of the screw the posts are caused to move toward and from each other. The three rods and the screw are held against relative axial or end-wise motion by means of a cross brace 19 secured to the rods between the extremities of a spool 18' on the intermediate portion of the screw.

Lifting or elevating and lowering mechanism is carried by the end frames and is constructed in a manner such that when the posts 14 of the end frames travel toward each other or travel apart such movement will impart raising and lowering movement to the elevating mechanism.

The elevating and lowering mechanism consists of opposed U frames having side arms 20 and bights or connecting portions for each pair of side arms which connecting portions carry sleeves 21 with lateral extension 22 forming load supporting members.

Each of the extensions 22 is maintained in horizontal position by means of an upstanding lever arm 23 connected by a link 24 with a depending lever arm 25 rigidly mounted on the upper horizontal frame member 11. The side members 20 of the U frames are provided with pivot eyes 26 which are fixed to a sleeve 10' rotatably mounted on the lower frame member 10 so that when the U frames are moved about the lower frame members 10 the sleeves with their lateral extensions 22 are raised and lowered, it being understood that the U frames only swing in a limited arc.

Each U frame has its arm 20 adjacent its posts 14 provided with an extension in the form of a curved lever 27 also fixed to sleeve 10' in effect a cam, which is engaged by a cam follower 28 on the intermediate rod 16.

It will readily be understood from the foregoing that the parts are so constructed and arranged that rotation of the screw 18 will cause the end frames to move toward and from each other and this rotation of the screw may be produced in any desired manner, as in example by means of a handle 29.

When the end frames move relative to each other they cause relative movement between the levers 27 and the cam follower 28 which in turn rotates the U frames about the lower horizontal members of the frames as pivots. Since the depending arm 25 is fixed to the upper of the horizontal frame member and is connected by link 24 and the up-right arm to the sleeve 21 the lateral extension 22 of the sleeve will be maintained in horizontal position. Also when the end frames are moved apart the lowering action will be correspondingly produced.

It will further be readily understood that force multiplication between the handle 29 and the sleeve and lateral extension 22 will be large and enable substantial heavy loads to be supported.

In the use of the device the elevated mechanism is lowered sufficiently to permit the device to be rolled beneath the portion of the vehicle or device that is to rest upon the sleeves 21 and their lateral extension 22 whereupon the lifting mechanism is raised until it engages the portion to be supported. After the bolts or fastening elements are unfastened the device is operated for lowering the differential or other supported objects and the supported object may then be removed.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. A dolly comprising a pair of rectangular end frames of a width greater than their height and having upper, lower and end members, guide rods slidably connecting the ends of said frames, a screw associated with said guide rods and having reverse threads engaging said frames so that rotation of said screw will produce relative movement between said frames, means for rotating said screw, a pair of elevating frames mounted one on each of the lower members of said rectangular end frames and having cooperating laterally extending portions disposed in contiguous relation for supporting an object, each of said elevating frames having an operating extension, and a means comprising followers on said guide rods engaging said extensions so that when said end frames move relatively the contiguous ends of the elevating frames will be raised and lowered.

2. A dolly comprising a pair of rectangular end frames of a width greater than their height and having upper, lower and end members, guide rods slidably connecting the ends of said frames, a screw associated with said guide rods and having reverse threads engaging said frames so that rotation of said screw will produce relative movement between said frames, a pair of elevating frames mounted one on each of the lower members of said rectangular end frames and having cooperating portions disposed in contiguous relation for supporting an object, and means whereby when said end frames move relatively the contiguous ends of the elevating frames will be raised and lowered.

3. A dolly comprising a pair of rectangular end frames of a width greater than their height and having upper, lower and end members, guide rods slidably connecting the ends of said frames, a screw associated with said guide rods and having reverse threads engaging said frames so that rotation of said screw will produce relative movement between said frames, means for rotating said screw, a pair of elevating frames mounted one on each of the lower members of said rectangular end frames and having cooperating laterally extending portions disposed in contiguous relation for supporting an object, each of said elevating frames having an operating extension, and a pair of followers on one of said guide rods each engaging one of said extensions so that when said end frames move relatively the contiguous ends of the elevating frames will be raised and lowered.

4. A dolly comprising a pair of rectangular end frames of a width greater than their height, and having upper, lower and end members, guide rods slidably connecting the ends of said frames, a screw associated with said guide rods and having reverse threads engaging said frames so that rotation of said screw will produce relative movement between said frames, a pair of elevating frames mounted one on each of the lower members of said rectangular end frames and having cooperating portions disposed in contiguous relation for supporting an object, means whereby when said end frames move relatively the contiguous ends of the elevating frames will be raised and lowered, and means for maintaining said cooperating portions in substantially the same horizontal plane during raising and lowering thereof.

5. A dolly as set out in claim 2 wherein said cooperating portions are pivotally mounted on said elevating frames and are connected to said end frames by a linkage which maintains said portions in substantially the same horizontal plane during raising and lowering thereof.

6. A dolly comprising a pair of rectangular end frames of a width greater than their height and having upper, lower and end members, guide rods slidably connecting the ends of said frames, a screw associated with said guide rods and having reverse threads engaging said frames so that rotation of said screw will produce relative movement between said frames, means for rotating said screw, a pair of elevating frames rotatably mounted one on each of the lower members of said rectangular end frames and having cooperating laterally extending portions disposed in contiguous relation for supporting an object, each of said elevating frames having an operating extension, and a pair of followers on one of said guide rods each engaging one of said extensions so that when said end frames move relatively the contiguous ends of the elevating frames will be raised and lowered.

HARDEE JOHNSTON, Jr.
ALEXANDER SMITH.

REFERENCES CITED

The following references are of record in the file of this patent:

UNITED STATES PATENTS

| Number | Name | Date |
|---|---|---|
| 558,561 | Neeb | Apr. 21, 1896 |
| 2,252,534 | Trotter | Aug. 12, 1941 |